(12) United States Patent
Yoshida et al.

(10) Patent No.: US 9,721,689 B2
(45) Date of Patent: Aug. 1, 2017

(54) METHOD FOR DECONTAMINATION OF AN OBJECT

(71) Applicants: Hideo Yoshida, Tokorozawa-shi, Saitama (JP); MORITA MIYATA CORPORATION, Tokyo (JP)

(72) Inventors: Hideo Yoshida, Tokorozawa (JP); Yasuhiro Suyama, Higashimurayama (JP)

(73) Assignees: Hideo Yoshida, Saitama (JP); Morita Miyata Corporation, Tokyo (JP)

( * ) Notice: Subject to any disclaimer, the term of this patent is extended or adjusted under 35 U.S.C. 154(b) by 0 days.

(21) Appl. No.: 14/969,866

(22) Filed: Dec. 15, 2015

(65) Prior Publication Data
US 2016/0172064 A1 Jun. 16, 2016

(30) Foreign Application Priority Data
Dec. 16, 2014 (JP) .................................. 2014-254458

(51) Int. Cl.
| | |
|---|---|
| *G21F 9/06* | (2006.01) |
| *G21F 9/00* | (2006.01) |
| *G21F 9/30* | (2006.01) |
| *C02F 1/461* | (2006.01) |
| *G21F 9/04* | (2006.01) |
| *G21F 9/12* | (2006.01) |
| *G21F 9/28* | (2006.01) |

(52) U.S. Cl.
CPC .......... *G21F 9/002* (2013.01); *C02F 1/46104* (2013.01); *G21F 9/04* (2013.01); *G21F 9/06* (2013.01); *G21F 9/12* (2013.01); *G21F 9/28* (2013.01); *G21F 9/30* (2013.01)

(58) Field of Classification Search
CPC ..... G21F 9/06; G21F 9/08; G21F 9/12; C02F 1/4672; C02F 1/4678; A62D 3/115; A62D 3/11
USPC .......................................... 588/20, 302, 303
See application file for complete search history.

(56) References Cited

U.S. PATENT DOCUMENTS

| | | | |
|---|---|---|---|
| 5,405,579 A | 4/1995 | Melzer et al. | |
| 2015/0306644 A1 | 10/2015 | Yoshida et al. | |

FOREIGN PATENT DOCUMENTS

| | | |
|---|---|---|
| JP | 5-192648 | 8/1993 |
| JP | 10-213697 | 8/1998 |
| JP | 2014-41066 | 3/2014 |

OTHER PUBLICATIONS

Choji, Tetsuji Takada, Eijl Tafu, Masamoto (Toyama National College of Technology) Hara, Masanori (University of Toyama); "Construction of Safe and Portable Apparatus for Cleaning and Repairing Soil Contaminated with Radioactive Cesium by Using Only Carbon Dioxide Gas, The First Fukushima Conference's Summary", The Society for Remediation of Radioactive Contamination in Environment, 21.

Ueda, Yuko Watanabe, Isao Toida, Hideki Honda, Katsuhisa (Center of Advanced Technology for the Environment, Faculty of Agriculture, Ehime University); "Proposal of Decontamination Technique of Radioactive Materials Using Electrolysis"; The First Fukushima Conference's Summary, The Society for Remediation of Radioactive Contamination in Environment, 92.

*Primary Examiner* — Edward Johnson
(74) *Attorney, Agent, or Firm* — Norris McLaughlin & Marcus, P.A.

(57) ABSTRACT

An object to be decontaminated contaminated with radioactive material, e.g., contaminated soil or water, is introduced into eluting solvent and dissolved, and the radioactive material is separated from the object to be contaminated by elution of the radioactive material into the eluting solvent. The eluting solvent containing the radioactive materials dissolved therein and the object to be decontaminated are separated into solid and liquid. The soil after solid-liquid separation and from which the radioactive material is removed is collected, and the eluting solvent after solid-liquid separation and a separated liquid containing contaminated water are introduced into an electrolysis tank and electrolyzed. Metal ions such as those of the radioactive materials are deposited on the cathode in the electrolysis tank. Hydrogen containing tritium generated in electrolysis is collected in the electrolysis tank. The hydrogen is moved to the outside of the electrolysis tank and trapped.

9 Claims, 11 Drawing Sheets

Procedure of Decontamination Work for Soil of the Present Invention

Fig. 4 (a) Collect Contaminated Soil

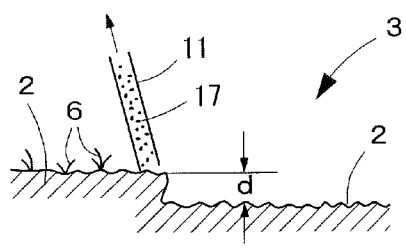

Fig. 4 (b) Collect Contaminated Soil and Tritiated Water

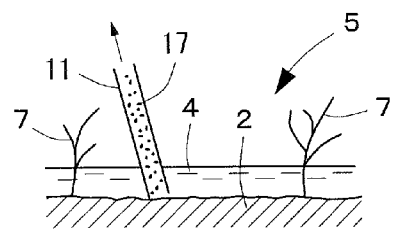

Fig. 4 (c) Dissolve and Stir Radioactive Cesium and Tritium into Carbonated Water

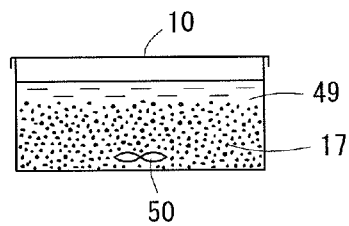

Fig. 4 (d) Solid-Liquid Separation of Soil to be Decontaminated and Contaminated Water

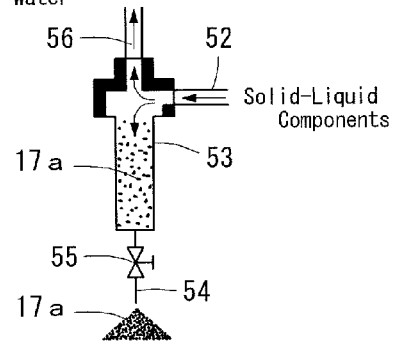

Fig. 4 (e) Electrolysis of Separation liquid, Deposition of Radioactive Cesium, Strontium, and Heavy Metals on Cathode, and Collection of Hydrogen Containing Tritium

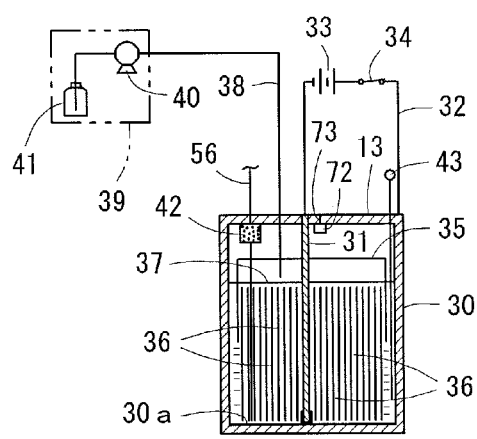

Fig. 4 (f) Charge Collected Hydrogen into Gas Cylinder

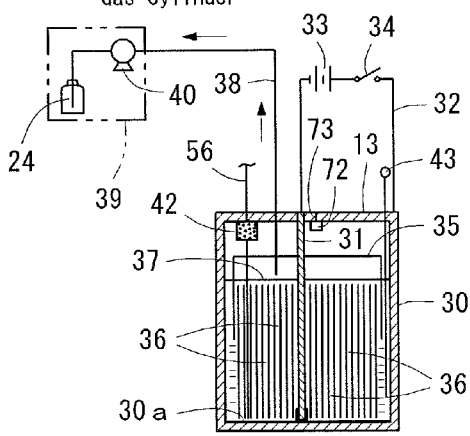

Fig. 4 (g) Add Soil Activator

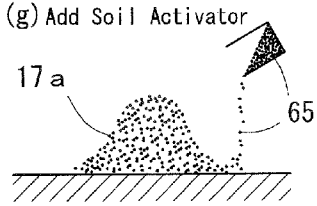

Fig. 4 (h) Return Decontaminated and Improved Soil to Original Farmland

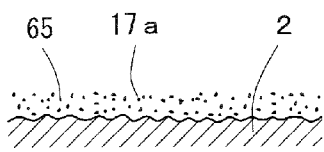

Fig. 5

Before Introduction of Contaminated Soil and Contaminated Water

Preparation of Carbonated Water, Introduction of Contaminated soil and Contaminated Water, and Separation of Cesium

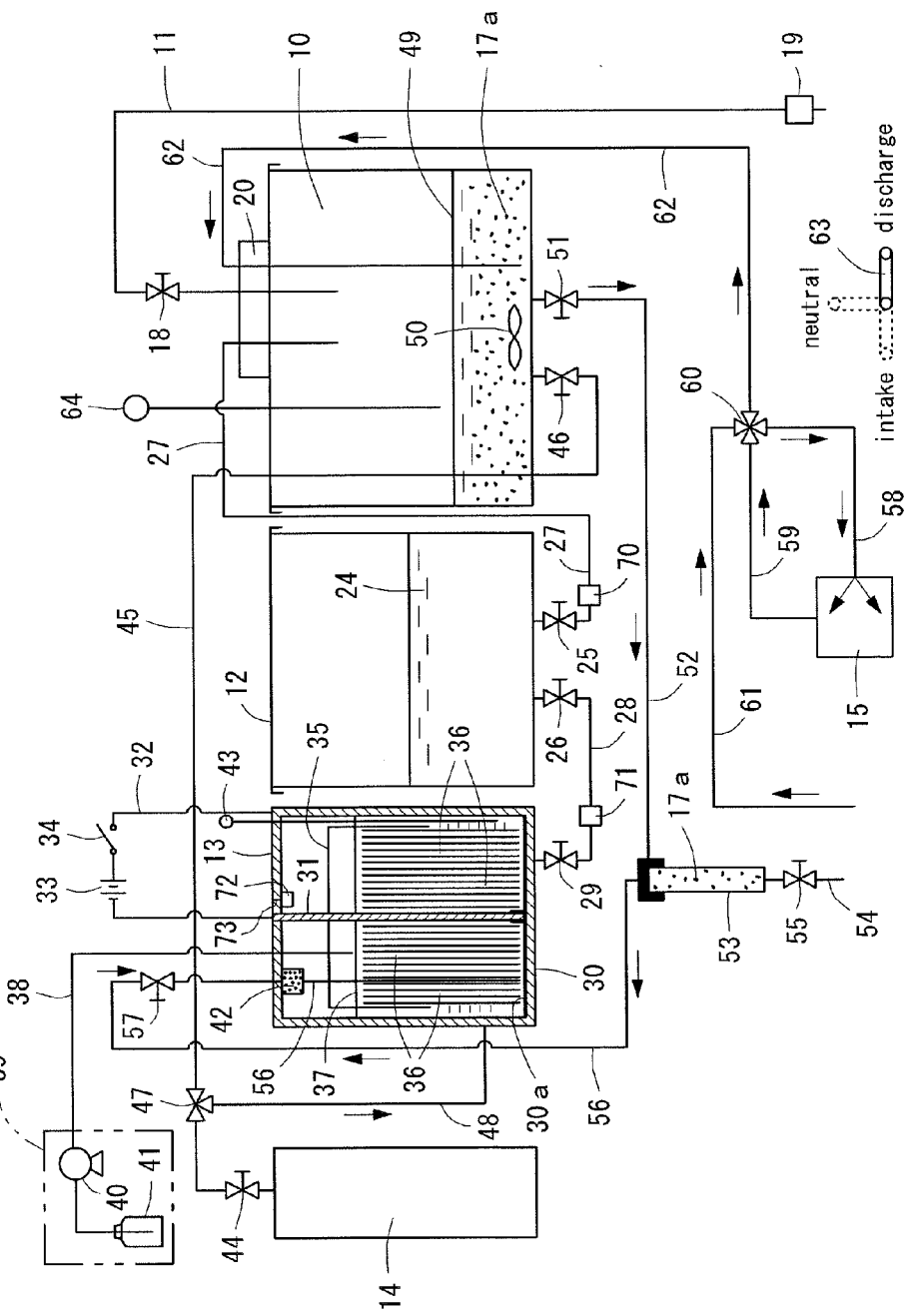
Fig. 7  After Separation of Cesium, Solid-Liquid Separation of Carbonated Water and Contaminated Soil, and Introduction of Separated Liquid into Electrolysis Tank

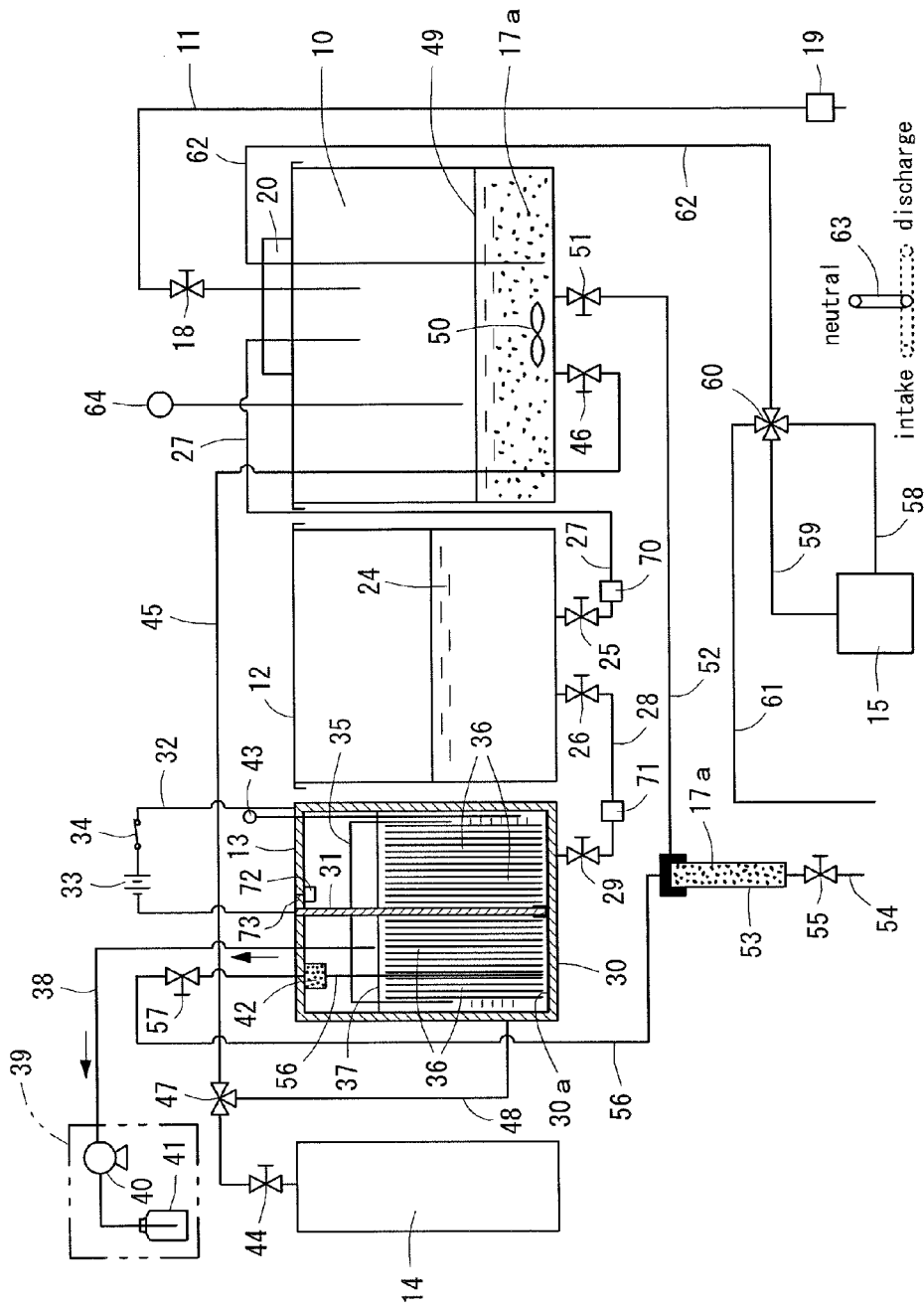
Fig. 8  Electrolysis of Separation Liquid in Electrolysis Tank, Deposition of Cesium Ions and Metal Ions on Cathode, and Collection and Trapping of Hydrogen Containing Tritium

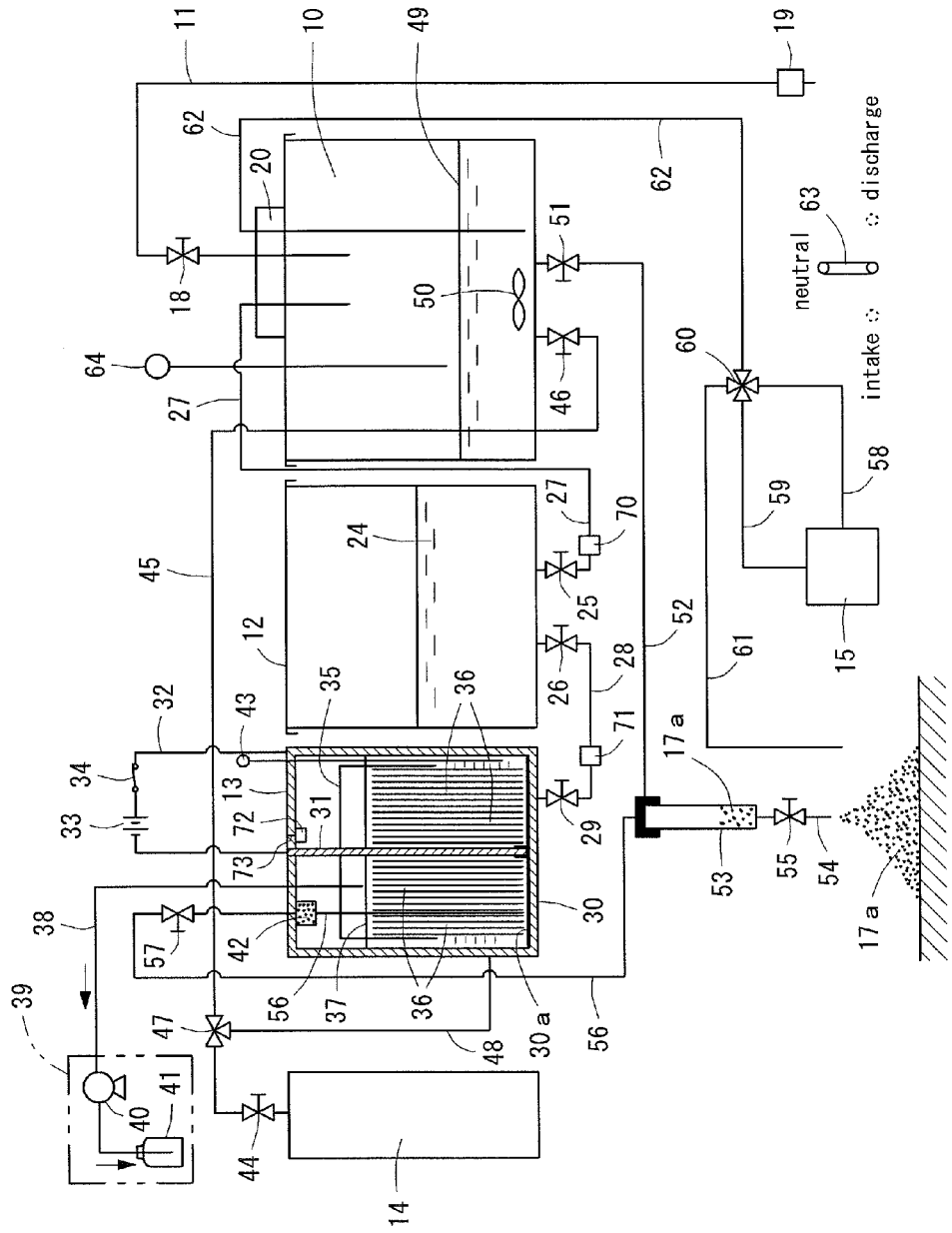
Fig. 9  Collection of Decontaminated Soil and Charge Hydrogen into Gas Cylinder

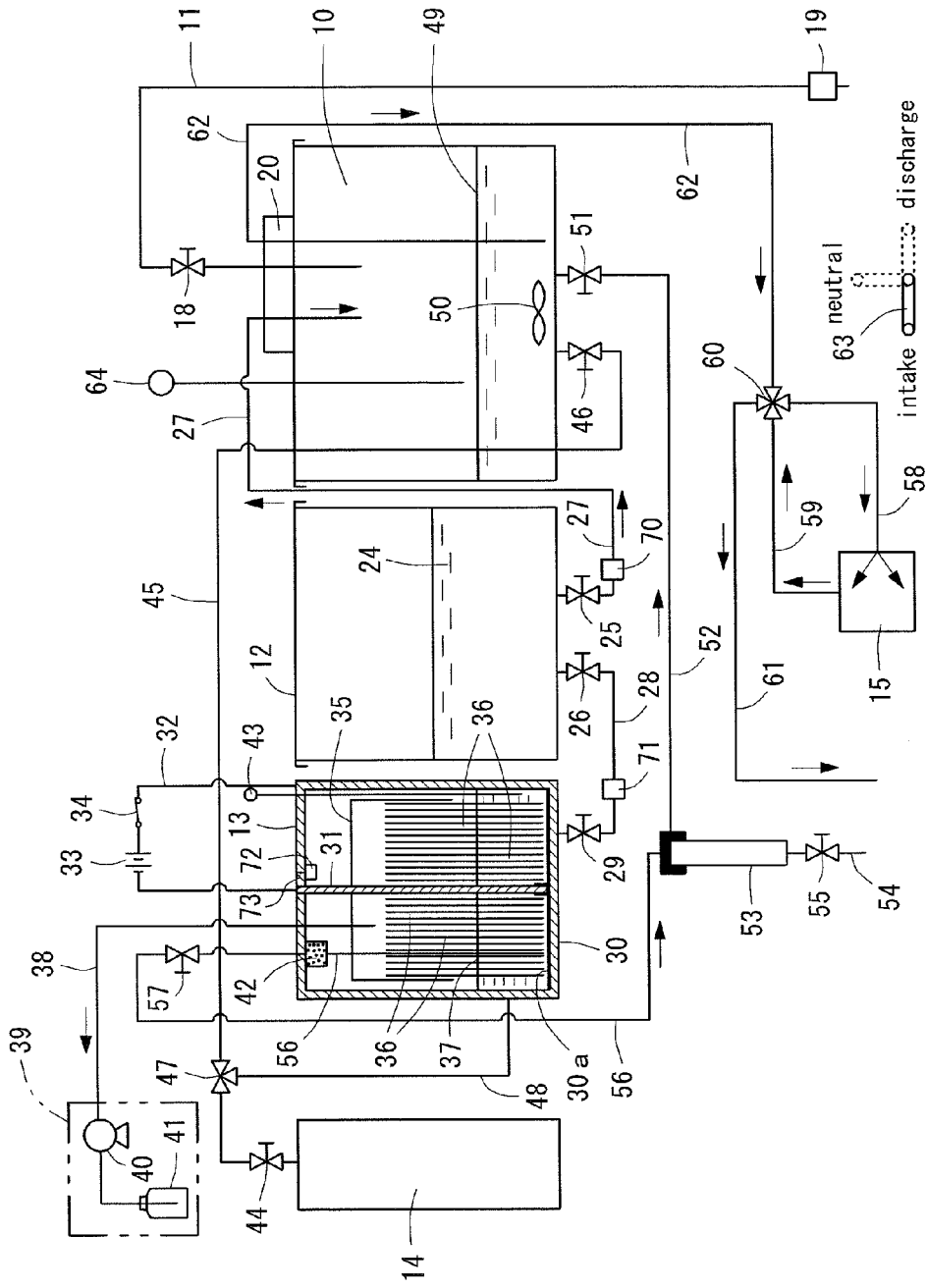
Fig. 10  Return Clean Separated Liquid to Separation Vessel After Electrolysis Storage of Used Electrolysis Tank Storage of Used Electrolysis Tank Storage of Gas Cylinders Charged with Hydrogen

METHOD FOR DECONTAMINATION OF AN OBJECT

BACKGROUND OF THE INVENTION

The present invention relates to a decontamination method and system for soil and the like for decontaminating soil of, for example, fields, and water contaminated with radioactive materials reliably and rapidly on site, aiming to perform decontamination with precision and improved efficiency. The Great East Japan Earthquake occurred on March 2011 caused an accident of the Fukushima Daiichi Nuclear Power Plant of Tokyo Electric Power Company. The accident has dispersed harmful radioactive materials in a wide area and contaminated cities and towns, fields, mountains and forests, the sea, lakes and marshes, and rivers. The radioactive materials adhered to or deposited on persons, animals, and plants have endangered their lives and caused serious damage, stopping various industrial activities such as farming, forestry, livestock farming, fishery, and the like.

Removal of such radioactive materials from living environments and industrial activity areas is mandatory for recovery and restart of industrial activities. Decontamination of soil in fields is an urgent problem especially for people engaged in farming.

However, contamination has widely spread over fields and scattered throughout villages and mountains as well as plains. Decontaminating such wide areas with human power requires a great amount of time and labor, which is inefficient. The advanced age of many people engaged in farming also makes the decontamination work extremely difficult.

In order to deal with the contamination treatment or decontamination treatment of such soil, there is a method for decontaminating halide radioactive wastes by dissolving radioactive material into solvent and then separating the radioactive material from the solvent. In this case, halide is dissolved into water, which is a solvent, to precipitate rare earth elements in the solvent, and the precipitate is collected. As a means for separating non-radioactive material from the solvent, the solvent is evaporated or cooled to precipitate the non-radioactive material (refer, for example, to Patent Document 1).

However, in the above decontamination method, the technique in which the radioactive material is collected by dissolving halide in water shows a low collection rate. Further, another technique which includes steps of evaporation and cooling of the solvent requires a heating device and cooling facilities, thereby making the facilities large-scale and expensive.

Still another example of soil decontamination methods includes digging the soil contaminated with harmful chemical materials, putting the soil into a hopper of heating device, and heating the soil while washing by using nitrogen to desorb and separate the contaminants in the soil (refer, for example, to Patent Document 2).

Such a decontamination method also has problems. The method requires time and labor for moving the contaminated soil to a remote decontamination device and additionally for returning the decontaminated soil to the original position. Further, the contaminated soil needs to be excavated deeply, not only the surface soil. Thus, the method requires an appropriate excavating facility, making the decontamination expensive and large-scale. Additionally, the decontamination device further requires a nitrogen washing machine, heating device, and separator, and thus making the decontamination large scale and expensive.

There is still another example of decontamination methods for soil contaminated with radioactive cesium. The contaminated soil is stored in a water supply tank, and carbon-dioxide gas of high partial pressure is injected into the tank to supply hydrogen ions. After extracting cesium ions on the surfaces of soil particles into a liquid phase, the solution is shifted to a separation vessel which is open to air and the carbon-dioxide gas is released into the air. Then, the pH value in the liquid phase is raised to separate therefrom ions such as alkaline earth metals other than cesium and the ions are deposited on carbonates or hydroxides, and the cesium remaining in the liquid phase is condensed and separated (refer, for example, to Non-Patent Document 1).

The above-described soil decontamination method also has shortcomings. In the above decontamination method, the liquid phase of supernatant fluid in the water supply tank is sent to the separation vessel so that the supernatant fluid does not contain much cesium, which has a high specific gravity. This leads to a low efficiency of concentration and separation of cesium. Further, cesium accumulates in the lower part of the water supply tank and promotes attachment and deposition on the soil, and thereby lowering the effect of decontamination. Accordingly, use of decontaminated soil has been difficult and impractical.

Another decontamination method for soil contaminated with radioactive cesium includes adding water to the contaminated soil received in the reaction vessel, placing positive and negative electrodes in the reaction vessel, applying a voltage to the electrodes to attract radioactive cesium ions onto the negative electrode, depositing soil and other matter associated therewith on the positive electrode, and separating and collecting the radioactive cesium from the contaminated soil to significantly reduce the volume of the contaminants (refer, for example, to Non-Patent Document 2).

However, such a decontamination method for soil also has problems. Since the soil is received in the reaction vessel together with other matters, the method requires a high voltage application, which results in poor electrolysis efficiency. The radioactive cesium ions attracted onto the cathode contain foreign matters so that the cesium ions are separated with a low accuracy. Further, since the decontaminated soil also contains other matters, the separation process is time-consuming and the decontaminated soil cannot be used immediately.

To solve such problems, the applicants have developed and proposed a decontamination method and system for soil and the like (refer, for example, to Patent Document 3). The decontamination method and system for soil and the like include the steps of: introducing and dissolving an object to be decontaminated contaminated with radioactive materials into an acid eluting solvent, condensing and separating the radioactive materials from the eluting solvent, wherein the object to be decontaminated includes contaminated soil and contaminated water, one or both of which are collected and introduced into the eluting solvent to perform solid-liquid separation of the radioactive materials and the object to be decontaminated dissolved in the eluting solvent, the soil which has been separated from the eluting solvent is further separated into solid and liquid and collected, aiming to reduce the volume of the contaminated soil and to reutilize the soil which includes no radioactive material and to restart of farming, wherein the eluting solvent in which the radioactive materials after solid-liquid separation are dissolved is electrolyzed and condensed, the radioactive cesium ions deposited on an electrode are adsorbed on an adsorbent and collected, the adsorbent on which the radioactive cesium ions are adsorbed is sealed and stored in the container, and the container is stored in storage facilities as needed, thereby achieving a safe disposal of the radioactive materials.

The applicants had intended to remove radioactive cesium which has a great impact by the proposed decontamination method for soil and the like, and had not intended to decontaminate radioactive materials other than radioactive cesium, for example, tritium ($^3$H) and tritiated water (HTO$^6$).

The tritium, or tritiated hydrogen, is a radioactive isotope of hydrogen with the mass number of three. Tritium is combined with oxygen and exists in water as tritiated water (HTO$^6$). Tritiated water exists in hydrosphere in states of gas, liquid, and solid phases. Tritiated water has been spread widely in vapor, precipitation, groundwater, rivers, lakes, sea water, drink water, and living things.

Generally, tritium has been considered as one of the least toxic radionuclides and taken lightly from a standpoint of effects on living things since tritium taken is distributed uniformly in a body, and tritium has a relatively short biological half-life (2.3 years) and has low energy. Tritium emits low beta rays but the radiation reaches only 1 μm in cells. While circulating through the entire body as blood, the tritium hardly attacks gene DNAs. When tritium is taken into a cell nucleus, the distance between the tritium and DNA becomes closer so that tritium starts attacking DNAs as radioactive cesium does.

Large amounts of hydrogen exits in DNA. Since tritium has the same chemical properties as those of hydrogen, tritium acts normally if replaced by hydrogen.

However, if tritium is changed into helium (He) after emitting radiation, DNAs in the portion where tritium is changed into helium is damaged and then the damage can become a risk, increasing cancer incidence. Such problems have been pointed out.

The background art referred to hereinabove is:
[Patent Document 1] JP-A-10-213697
[Patent Document 2] JP-A-5-192648
[Patent Document 3] JP-A-2014-41066
[Non-Patent Document 1]
Choji, Tetsuji Takada, Eiji Tafu, Masamoto (Toyama National College of Technology) Hara, Masanori (University of Toyama) Houshasei-seshiumu Osendojyo wo Tansan-gasu nomide Senjyo, Shufuku suru Anzen Anshin na Kahan-gata Souchi no Kouchiku (Construction of Safe and Portable Apparatus for Cleaning and Repairing Soil Contaminated with Radioactive Cesium by Using Only Carbon Dioxide Gas),
The First Fukushima Conference's Summary
The Society for Remediation of Radioactive Contamination in Environment, 21
[Non-Patent Document 2]
Ueda, Yuko Watanabe, Isao Toida, Hideki Honda, Katsuhisa (Center of Advanced Technology for the Environment, Faculty of Agriculture, Ehime University) Denki Bunkai wo Riyou shita Houshaseibushitsu Jyosen Gijyutsu no Teian (Proposal for Decontamination Technique of Radioactive Materials Using Electrolysis)
The First Fukushima Conference's Summary
The Society for Remediation of Radioactive Contamination in Environment, 92

SUMMARY OF THE INVENTION

The object of the present invention is to address such problems and provide a decontamination method and system for soil and the like for decontaminating soil of, for example, fields and water contaminated with radioactive materials reliably and rapidly on site, aiming to perform decontamination with precision and improved efficiency. The invention improves the decontaminated soil by adding soil activators to the decontaminated soil, and then the improved soil is returned to the original field readily to promote the restart of farming. Further, the invention separates the radioactive materials adhering to or deposited on the soil from the soil precisely and then the radioactive materials are condensed. The invention enables a reduction in the volume of the contaminated soil and achieves a safe treatment of the radioactive materials. Further, the invention enables decontamination of radioactive cesium and tritium, thereby relieving anxiety of internal exposure to the radiation of tritium, and enables an efficient and safe disposal of the decontamination apparatus.

According to a first aspect of the invention, a decontamination method includes: introducing and dissolving an object to be decontaminated, contaminated with radioactive materials, into an eluting solvent to separate the radioactive materials by elution thereof into the eluting solvent, the object to be decontaminated including contaminated soil and contaminated water and one or both of which being collected and introduced into the eluting solvent; separating the radioactive materials and the object to be decontaminated dissolved in the eluting solvent into solid and liquid; collecting the soil after solid-liquid separation and from which the radioactive materials are removed; electrolyzing a separated liquid containing the eluting solvent and the contaminated water after solid-liquid separation by introducing the separated liquid into an electrolysis tank; depositing metal ions such as the radioactive materials on a cathode; collecting hydrogen containing tritium generated by the electrolysis in the electrolysis tank; and trapping the hydrogen moved to an outside of the electrolysis tank. Accordingly, decontamination of tritium contained in the hydrogen is achieved, thereby relieving anxiety of internal exposure to the radiation of tritium.

The eluting solvent typically comprises water. Soil, as a whole, does not dissolve in water, so the herein use of the term "dissolved" regarding soil in the eluting solvent is intended to encompass "dispersed".

According to a second aspect of the invention, the electrolysis is performed in the electrolysis tank, and the electrolysis tank is hermetically sealed. Accordingly, hydrogen generated by the electrolysis can reliably be collected.

According to a third aspect of the invention, oxygen is discharged from the electrolysis tank upon a pressure of the oxygen accumulated in the electrolysis tank reaches a predetermined value or more during electrolysis. Accordingly, safety during electrolysis can be ensured.

A fourth aspect of the invention is one or a plurality of deposition members, to which an electric current is supplied from the cathode, being arranged around the cathode, and the metal ions such as the radioactive materials are deposited on the cathode and the deposition members. Accordingly, radioactive cesium, other radioactive materials, and the metal ions such as heavy metal in the separated liquid are removed precisely and decontaminated.

According to a fifth aspect of the invention, the separated liquid is introduced into an adsorption filter before being introduced to the electrolysis tank, and the metal ions such as the radioactive materials are adsorbed by the adsorption filter. Accordingly, the metal ions such as the radioactive materials are efficiently adsorbed on the adsorption filter and in the electrolysis tank separately, thereby improving the time for electrolysis in the electrolysis tank.

According to a sixth aspect of the invention, the hydrogen is charged into a gas cylinder for storage. Accordingly, tritium contained in hydrogen is prevented from leaking and stored safely.

According to a seventh aspect of the invention, the cathode, the deposition member, the metal ions such as the radioactive materials deposited on the cathode and the deposition member, a collector for collecting hydrogen, remaining separated liquid, and the adsorption filter are left as they are in the used electrolysis tank and stored. Accordingly, inconvenience of storing them separately can be avoided, and thus, efficient and safe storage can be achieved easily and at low cost.

According to an eighth aspect of the invention, tritiated water is mixed in the contaminated water. Accordingly, tritium contained in the tritiated water is removed and decontaminated by collecting hydrogen generated by electrolyzing the contaminated water and the separated liquid that contain tritiated water.

According to a ninth aspect of the invention, the radioactive materials include radioactive cesium and tritium. Accordingly, the objects to be decontaminated include radioactive cesium, which is highly reactive and has a relatively long-term half-life, and tritium, which has a relatively short half-life and has been considered as one of the least toxic radionuclide and thus taken lightly. Accordingly, decontamination of various types of radioactive materials is achieved.

According to a tenth aspect of the invention, a decontamination system for soil and the like includes: a separation vessel for receiving an object to be decontaminated, contaminated with radioactive materials, and an eluting solvent, and for dissolving the radioactive materials into the eluting solvent; a solid-liquid separation filter for separating the radioactive materials dissolved into the eluting solvent and the object to be decontaminated into solid and liquid; an electrolysis tank for receiving and electrolyzing a separated liquid including the eluting solvent and contaminated water after solid-liquid separation; the object to be decontaminated including contaminated soil and contaminated water, the soil after solid-liquid separation and from which the radioactive materials are removed being collected, metal ions such as the radioactive materials being deposited on a cathode; a collector for collecting hydrogen provided in the electrolysis tank and collects hydrogen containing tritium generated by electrolysis, whereby the hydrogen is moved to an outside of the electrolysis tank and trapped. Accordingly, decontamination of tritium contained in the hydrogen is achieved, thereby relieving anxiety of internal exposure to the radiation of tritium.

According to an eleventh aspect of the invention, the electrolysis tank includes a hollow airtight container, the cathode is provided at the center portion of the airtight container, and the airtight container is set as an anode and a positive electric potential is applied. Accordingly, electrolysis can be performed in the airtight container, and the generated hydrogen is prevented from leaking, thereby performing electrolysis safely.

A twelfth aspect of the invention is a safety valve provided in a space above the collector in the electrolysis tank, and oxygen is discharged from the electrolysis tank when a pressure of the oxygen accumulated in the electrolysis tank reaches a predetermined value or more. Accordingly, safety during electrolysis can be ensured.

A thirteenth aspect of the invention is one or a plurality of deposition members, wherein the deposition member is provided below the collector to surround the cathode, and the metal ions such as the radioactive materials are deposited on the cathode and the deposition members. Accordingly, metal ions such as the radioactive materials are deposited precisely and efficiently.

According to a fourteenth aspect of the invention, one end of a trap conduit is provided in the collector and the other end is provided at a hydrogen-gas charging device, the hydrogen-gas charging device includes a suction pump for suctioning hydrogen in the collector, and a charging device for injecting the hydrogen into a gas cylinder. Accordingly, hydrogen is suctioned from the collector and charged into the gas cylinder safely.

A fifteenth aspect of the invention is an adsorption filter for adsorbing the metal ions such as the radioactive materials in the separated liquid, and the adsorption filter is provided in the electrolysis tank. Accordingly, the filter adsorbs the metal ions such as the radioactive materials rationally, together with the electrolysis tank, and the used electrolysis tank is stored easily.

According to a sixteenth aspect of the invention, the airtight container has a bottom coated with insulating materials. Accordingly, generation of oxygen at the inside bottom of the airtight container is prevented, and thus hydrogen can be collected safely. A seventeenth aspect of the invention is a decontamination vehicle which can be moved to a collection site of the object to be decontaminated, wherein the vehicle is equipped with the separation vessel, the electrolysis tank, the solid-liquid separation filter, a carbon-dioxide gas cylinder for generating an eluting solvent, a water supply tank, and a hydrogen-gas charging device. Accordingly, the radioactive materials including tritium is decontaminated at the collection site of the object to be decontaminated organically and rationally.

According to a first aspect of the invention, hydrogen containing tritium generated by electrolysis is collected in the electrolysis tank and the hydrogen is moved to an outside of the electrolysis tank and trapped. Accordingly, decontamination of tritium contained in the hydrogen is achieved, thereby relieving anxiety of internal exposure to the radiation of tritium.

According to a second aspect of the invention, the electrolysis is performed in the electrolysis tank, and the electrolysis tank is hermetically sealed. Accordingly, hydrogen generated by the electrolysis can be reliably collected.

According to a third aspect of the invention, oxygen is discharged from the electrolysis tank when a pressure of the oxygen accumulated in the electrolysis tank reaches a predetermined value or more during electrolysis. Accordingly, safety during electrolysis can be ensured.

A fourth aspect of the invention is one or a plurality of deposition members, to which an electric current is supplied from the cathode, being arranged around the cathode, and the metal ions such as radioactive materials are deposited on the cathode and the deposition members. Accordingly, radioactive cesium, other radioactive materials, and the metal ions such as heavy metal in the separated liquid are removed precisely and decontaminated.

According to a fifth aspect of the invention, the separated liquid is introduced into an adsorption filter before being introduced to the electrolysis tank, and the metal ions such as the radioactive materials are adsorbed by the adsorption filter. Accordingly, the metal ions such as radioactive materials are efficiently adsorbed on the adsorption filter and in the electrolysis tank separately, thereby improving the time for electrolysis in the electrolysis tank.

According to a sixth aspect of the invention, the hydrogen is charged into a gas cylinder for storage. Accordingly, tritium contained in hydrogen can be prevented from leaking and stored safely.

According to a seventh aspect of the invention, the cathode, the deposition member, metal ions such as the radioactive materials deposited on the cathode and the deposition member, a collector for collecting hydrogen, remaining separated liquid, and the adsorption filter are left as they are in the used electrolysis tank and stored. Accordingly, inconvenience of storing them separately can be avoided, and thus, efficient and safe storage can be achieved easily and at low cost.

According to an eighth aspect of the invention, tritiated water is mixed in the contaminated water. Accordingly, tritium contained in the tritiated water can be removed and decontaminated by collecting hydrogen generated by electrolyzing the contaminated water and the separated liquid that contain tritiated water.

According to a ninth aspect of the invention, the radioactive materials include radioactive cesium and tritium. Accordingly, the objects to be decontaminated include radioactive cesium, which is highly reactive and has a relatively long-term half-life, and tritium, which has a relatively short half-life and has been considered as one of the least toxic radionuclides and thus taken lightly. Accordingly, decontamination of various types of radioactive materials can be achieved.

According to a tenth aspect of the invention, a collector for collecting hydrogen is provided in the electrolysis tank, the hydrogen containing tritium generated in electrolysis is collected, and the hydrogen is moved to the outside of the electrolysis tank and trapped. Accordingly, decontamination of tritium contained in the hydrogen is achieved, thereby relieving anxiety of internal exposure to the radiation of tritium.

According to an eleventh aspect of the invention, the electrolysis tank includes a hollow airtight container, the cathode is provided at the center portion of the airtight container, and the airtight container is set as an anode and a positive electric potential is applied. Accordingly, electrolysis can be performed in the airtight container, and the generated hydrogen is prevented from leaking, thereby performing electrolysis safely.

A twelfth aspect of the invention is a safety valve provided in a space above the collector in the electrolysis tank, and oxygen is discharged from the electrolysis tank upon a pressure of the oxygen accumulated in the electrolysis tank reaches a predetermined value or more. Accordingly, safety during electrolysis can be ensured.

A thirteenth aspect of the invention is one or a plurality of deposition members, wherein the deposition member is provided below the collector to surround the cathode, and the metal ions such as the radioactive materials are deposited on the cathode and the deposition members. Accordingly, the metal ions such as the radioactive materials can be deposited precisely and efficiently.

According to a fourteenth aspect of the invention, one end of a trap conduit is provided in the collector and the other end is provided at a hydrogen-gas charging device, the hydrogen-gas charging device includes a suction pump for suctioning hydrogen in the collector, and a charging device for injecting the hydrogen into a gas cylinder. Accordingly, hydrogen is suctioned from the collector and can be charged into the gas cylinder safely.

A fifteenth aspect of the invention is an adsorption filter for adsorbing the metal ions such as the radioactive materials in the separated liquid, and the adsorption filter is provided in the electrolysis tank. Accordingly, the filter adsorbs the metal ions such as the radioactive materials rationally, together with the electrolysis tank, and the used electrolysis tank is stored easily.

According to a sixteenth aspect of the invention, the airtight container has a bottom coated with insulating materials. Accordingly, generation of oxygen at the inside bottom of the airtight container is prevented, and thus hydrogen can be collected safely.

A seventeenth aspect of the invention is a decontamination vehicle which can be moved to a collection site of the object to be decontaminated, wherein the vehicle is equipped with the separation vessel, the electrolysis tank, the solid-liquid separation filter, a carbon-dioxide gas cylinder for generating an eluting solvent, a water supply tank, and a hydrogen-gas charging device. Accordingly, the radioactive materials including tritium can be decontaminated at the collection site of the object to be treated organically and rationally.

BRIEF DESCRIPTION OF THE DRAWINGS

FIGS. 4(a) through 4(h) are explanatory diagrams showing procedures of the decontamination work of soil according to the invention.

FIG. 5 is an explanatory diagram showing a state of decontamination work of soil according to the invention, and showing a state in which before the contaminated soil and contaminated water are introduced into the separation vessel.

FIG. 7 is an explanatory diagram showing a state of decontamination work according to the invention, and showing a state in which radioactive cesium is separated in the separation vessel, and the carbonated water and the contaminated soil are introduced into the solid-liquid separation filter and the electrolysis tank.

FIG. 8 is an explanatory diagram showing a state of decontamination work according to the invention, and showing a state in which the separated liquid is electrolyzed in the electrolysis tank, and the metal ions such as radioactive cesium ions are deposited on the cathode, collecting and trapping hydrogen containing tritium.

FIG. 9 is an explanatory diagram showing a state of decontamination work according to the invention, and showing a state in which the soil to be decontaminated is collected and hydrogen is charged into the gas cylinder.

FIG. 10 is an explanatory diagram showing a state of decontamination work according to the invention, and showing a state of the separated liquid being cleaned and returned to the separation vessel after electrolysis of the separated liquid.

FIG. 11 shows a state of used electrolysis tank being stored according to the invention.

FIG. 12 shows a state of used electrolysis tank being stored according to the invention.

DETAILED DESCRIPTION OF THE INVENTION

Figure 1:
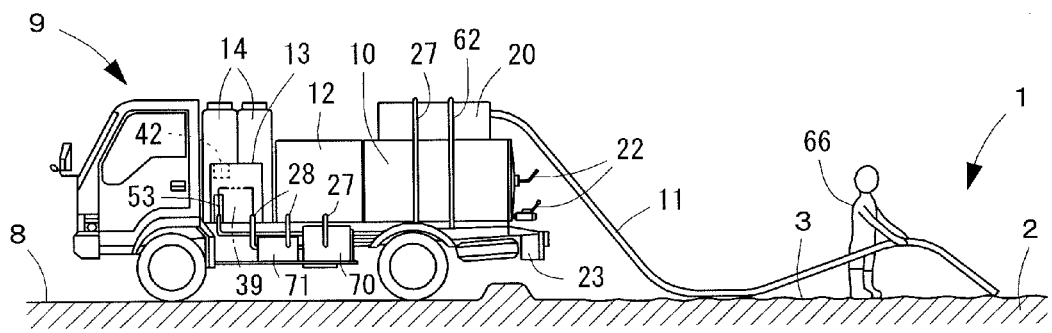
FIG. 1 is a front view showing a state of decontamination work using the decontamination vehicle equipped with the decontamination facilities of the invention.

Embodiments of the present invention will be described below with reference to the drawings, in which the invention is applied to decontamination of soil and contaminated water in fields, paddy fields, wetlands, and the like. In FIGS. 1 through 13, reference numeral 1 is an object area to be decontaminated and is contaminated with radioactive materials. The object area includes a field 3 with contaminated surface soil 2 containing a predetermined moisture or with contaminated surface soil 2 which is dried and hardened. The object area also includes a paddy field 5, the surface soil 2 of which is submerged into the contaminated water 4, and wetlands having a large amount of water. The invention can deal with decontamination for both cases. In drawings, reference numeral 6 represents weeds on the surface soil 2 of the field 3, and reference numeral 7 represents rice plants and weeds on the surface soil 2 in the contaminated water 4.

A decontamination vehicle 9 is parked in a farm road 8 or a space adjacent to the object area to be decontaminated 1. A suction hose 11 is pulled out from a decontamination tank 10, and a predetermined contaminated soil or contaminated water 4 which includes tritiated water ($HTO^6$) is sucked and collected from the end of the hose 11. In drawings, reference numeral "d" represents a depth of suction or collection of the surface soil 2 in the field 3 and the depth corresponds to a depth of penetrated cesium, which is a radioactive material. In some embodiments, 5 cm or more of the surface soil 2 is collected.

The decontamination vehicle 9 is configured by modifying a conventional vacuum truck. The vehicle body is equipped with a separation vessel 10, a water supply tank 12, an electrolysis tank 13, a gas cylinder 14 charged with carbon dioxide to a predetermined pressure, and a suction pump 15 for suctioning a solid, liquid, and gas.

The separation tank 10 is formed by a box container having an openable lid. The separation tank 10 is provided at the top of the lid with a rotatable cylindrical reel 16 around which the suction hose 11 can be wound. The reel 16 is rotatably biased in the counterclockwise direction in FIG. 3 via a recoil spring (not shown) and around which the suction hose 11 can be wound.

When the contaminated soil 17 is sucked, the suction hose 11 is pulled outwardly. The pulling force enables the reel 16 to rotate in the clockwise direction in FIG. 3 and thereby unreeling the suction hose 11.

One end of the suction hose 11 is in communication with the inside of the separation vessel 10. The contaminated soil 17 or contaminated water 4 sucked from the tip end is introduced into the separation vessel 10. The base part of the suction hose 11 is provided with an on-off valve 18. The other end of the suction hose 11 is provided with a filter 19 for preventing foreign matter to be sucked.

In drawings, reference numeral 20 is a cylindrical hose guide concentrically provided outside the reel 16, and the tangent portion of the hose guide is formed with a hose insertion hole 21. Reference numeral 22 is a hose clamp provided at the rear end of the separation vessel 10, and reference numeral 23 is a bottomed hose receptacle.

The water supply tank 12 is formed by a box container having an openable lid and is provided adjacent to the separation vessel 10. The water supply tank 12 stores clean water 24 therein for supplying a predetermined amount of water to the separation vessel 10 and the electrolysis tank 13. In this case, it is preferable that a heater be provided on the periphery of the water supply tank 12 to prevent the water 24 from freezing.

The on-off valves 25, 26 are provided at the bottom of the water supply tank 12. Respective one ends of water supply conduits 27, 28 are connected to the on-off valves 25, 26. The other end of the water supply conduit 27 is provided at the upper part in the separation vessel 10, and the other end of the water supply conduit 28 is connected to an on-off valve 29 provided at the bottom of the electrolysis tank 13.

The electrolysis tank 13 includes a cylindrical airtight container 30 made of stainless steel plate, and it has a capacity of about 1.8 L. The surface of the electrolysis tank 13 is coated with lead to shield radiation. The electrolysis tank 13 is provided isolated from the vehicle body and the adjacent parts. The airtight container 30 has a bottom surface with an insulating coating 30a to prevent generation of oxygen from the coated portion. The oxygen is generated from the inner surface of the side wall except the portion with the insulating coating 30a. The generated oxygen moves up along the inner surface of the side wall and accumulates in the upper space of a collector 35 provided at the top of the airtight container 30.

It is preferable that a heater (not shown) be provided on the outer periphery of the electrolysis tank 13 for heating to promote electrophoresis of, for example, cesium ions and heavy metal ions.

A rod-like cathode 31 is vertically provided by passing through the center of the airtight container 30. A lead 32 is wired to the cathode 31 and the airtight container 30, which is an anode, and the lead 32 is connected to a DC power 33 and a switch 34.

The lower end of the cathode 31 is provided immediately above the bottom of the airtight container 30. A cylindrical collector 35 for collecting hydrogen is provided on the middle and high portion of the cathode 31 in the airtight container 30. The collector 35 is a deep cylindrical container having an opening on one side and arranged with the opening faces downwardly.

One or a plurality of deposition members 36 is provided adjacent to each other at the lower part of the inner side of the collector 35. The deposition member 36 is placed to surround the cathode 31 and electrically connected to the cathode 31.

The deposition member 36 according to the present embodiment is made of a wire-netting drum, a metal plate, a metal rod, and the like. The deposition member 36 is submerged in a separated liquid 37 introduced from a solid-liquid separation filter, described later, during electrolysis.

The gas cylinder 14 stands in a space defined by the water supply tank 12 and the electrolysis tank 13. An on-off valve 44 is provided at the top end of the gas cylinder 14. The on-off valve 44 is connected to one end of a gas conduit 45, and the other end of the gas conduit 45 is connected to an on-off valve 46 provided at the bottom of the separation vessel 10.

The three-way valve 47 is provided at an upper stream of the gas conduits 45. One end of the gas conduit 48 is connected to the three-way valve 47, and the other end of the gas conduit 48 is connected to the lower peripheral surface of the electrolysis tank 13 to supply carbon dioxide.

A trap 38 has one end provided above the liquid surface of the separated liquid 37 and at the upper part of the collector 35. The other end of the trap 38 passes through the collector 35 and the airtight container 30 and connects to a hydrogen-gas charging device 39 provided outside.

The hydrogen-gas charging device 39 includes a suction pump 40 and a gas cylinder 41 for charging hydrogen gas. The inlet of the gas cylinder 41 is provided removably with the end of the trap 38 and with an on-off valve (not shown) which is normally closed.

In drawings, reference numeral 42 denotes an adsorption filter such as zeolite provided at the top of the airtight container 30 and the filter adsorbs the radioactive materials and heavy metals in the separated liquid 37 introduced from a solid-liquid separation filter, which will be described later. Reference numeral 43 represents a pH sensor provided in the separated liquid 37 in the airtight container 30 for measuring acid concentration of the separated liquid 37.

After water is supplied to the separation vessel 10, carbon dioxide is supplied to the separation vessel 10 from the gas cylinder 14 via the gas conduit 45. Carbonated water ($H_2CO_3$) 49 having a predetermined acid concentration is prepared by using the carbon dioxide in the separation vessel 10 as an eluting solvent for radioactive cesium. In some embodiment, the acid concentration of the carbonated water 49 in the separation vessel 10 is set to pH 3 to 7 and the carbonated water 49 is used as an electrolyte in the electrolysis tank 13. In drawings, reference numeral 50 denotes a stirring fan provided at the bottom of the separation vessel 10.

An on-off valve 51 is provided at the bottom of the separation vessel 10. A solid-liquid conduit 52 has one end connected to the on-off valve 51, and the other end connected to a tubular solid-liquid separation filter 53 which is vertically long.

The solid-liquid separation filter 53 is vertically provided and a rotating tube (not shown) is provided therein. A centrifuge (not shown) is provided inside the rotating tube. In the solid-liquid components introduced from the separation vessel 10, the heavy soil 17 is moved to the outer side of the rotating tube and the carbonated water 49 which includes a mixture of radioactive cesium ions and tritiated water is move to the inner side of the rotating tube by their specific gravities to perform solid-liquid separation. The soil 17a which has been separated from the radioactive material and the carbonated water is allowed to sink and accumulate in the lower part of the separation filter 53 so that the soil 17a can be collected from outside and the separated liquid 37 containing radioactive cesium, strontium, and heavy metals can be sent to the electrolysis tank 13.

A discharge pipe 54 is protruded from the lower part of the solid-liquid separation filter 53. The discharge pipe 54 is provided with an openable and closable discharge valve 55. The soil 17a can be collected by opening the discharge valve 55.

Accordingly, if a plurality of solid-liquid separation filters 53 is provided in the solid-liquid conduit 52, the carbonated water 49 containing the soil 17a, radioactive cesium ions, and tritiated water can be separated with high accuracy and efficiently.

A separation-liquid duct 56 has one end connected to the center of the top end of the solid-liquid separation filter 53 and the other end connected the adsorption filter 42 via the on-off valve 57, and the end of the duct is placed at the bottom of the airtight container 13. Then, radioactive cesium, strontium, and the metal ions such as heavy metals are deposited on the cathode 31 and plural deposition members 36 in the electrolysis tank 13. After collecting hydrogen in the collector 35 generated by electrolysis, the centrifuge is stopped and then clean carbonated water 49 which includes no radioactive material in the electrolysis tank 13 is returned to the separation vessel 10 via a return pipe (not shown).

A pair of loop conduits 58, 59 has respective one ends connected to the suction pump 15 and respective other ends connected to the four-way valve 60. A vent pipe 61 having one end open to the atmosphere and a communication pipe 62 having one end provided in the separation vessel 10 are connected to the rest of the two ports of the four-way valve 60.

The piping port of the four-way valve 60 can be switched by a switching lever 63 and the switching position thereof includes a neutral position, discharge position, and suction position, and is normally set at the neutral position. Accordingly, communication between the vent pipe 61 and the communication pipe 62, both connected to the four-way valve 60, and suction and discharge operation of the suction hose 11 provided in the separation vessel 10 can be controlled.

Figure 6:
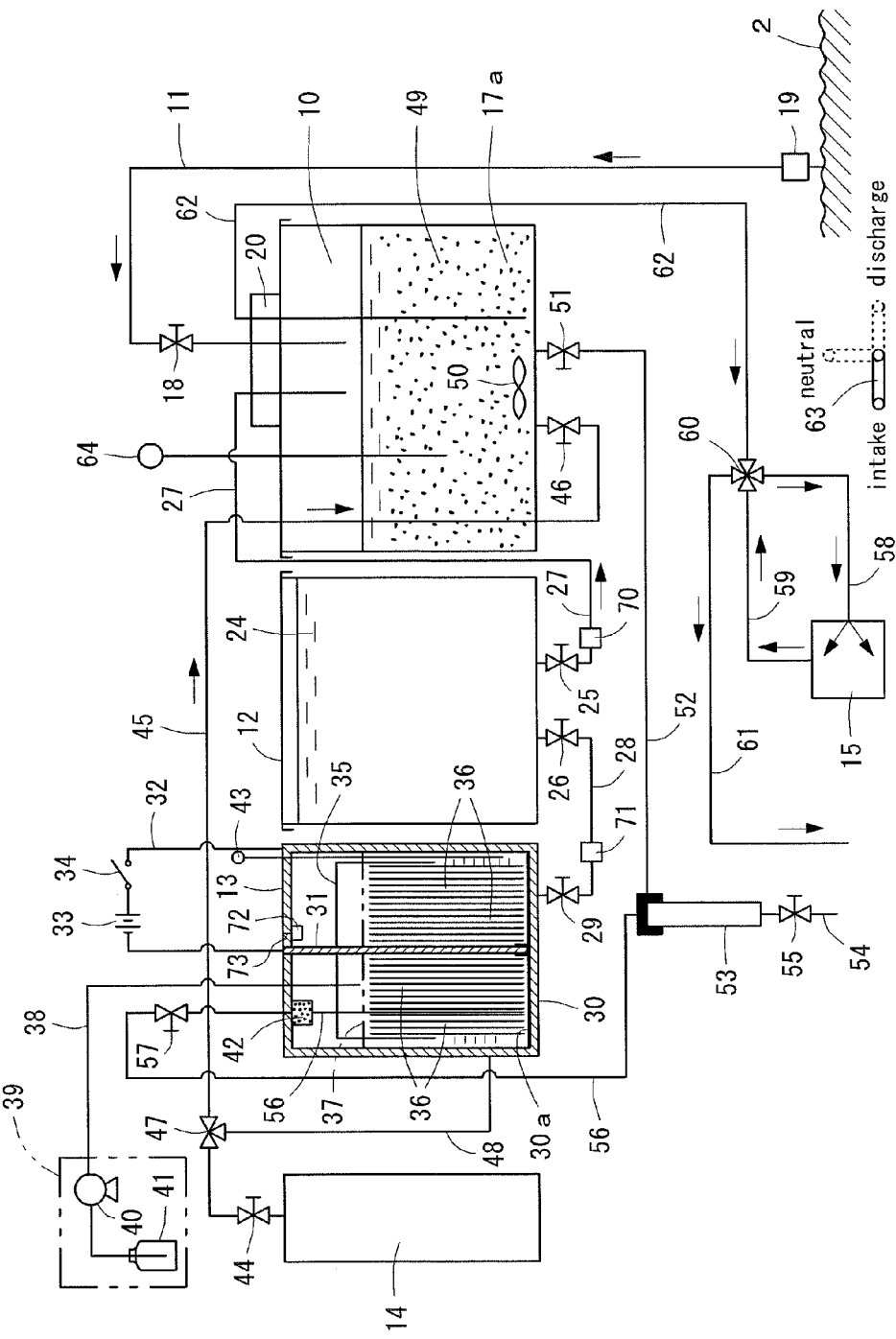
FIG. 6 is an explanatory diagram showing a state of decontamination work according to the invention, and showing a state in which the contaminated soil is introduced into the separation vessel, where the carbonated water has been prepared, and showing a state in which radioactive cesium is dissolved and separated.
Figure 1:
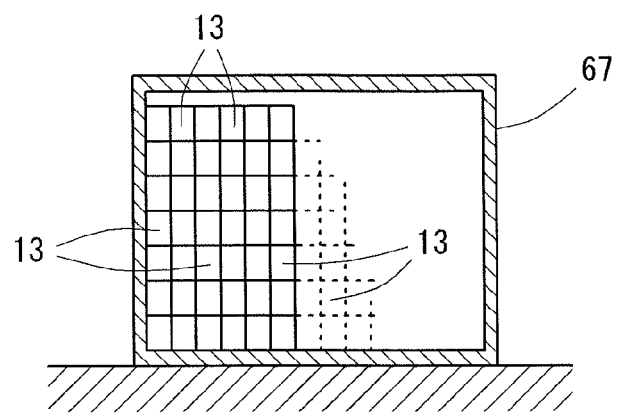
Figure 1:
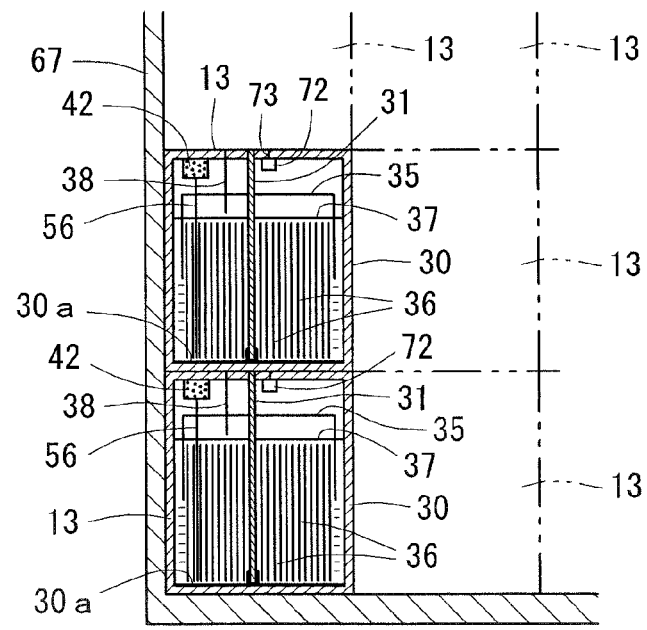

When the contaminated soil 17 is collected and introduced into the separation vessel 10, the suction pump 15 is actuated, and the switching lever 63 is switched from the neutral position to the suction position, as shown in FIG. 6. The loop conduits 58, 59 are allowed to communicate with the communication pipe 62 to create a negative pressure in the separation vessel 10. The contaminated soil 17 is suctioned from the end portion of the suction hose 11 and introduced into the separation vessel 10 and immersed into the carbonated water 49. The contaminated soil 17 introduced into the separation vessel 10 is then subjected to diproton acid cleaning by the carbonated water 49. Thus, the metal ions such as radioactive cesium ions, strontium, and heavy metals are ionized and conveyed to the solid-liquid separation filter 53 and electrolysis tank 13 together with the contaminated soil 17 and the carbonated water 49.

At that time, the suction pump 15 is actuated and the switching lever 63 is switched from the suction position to the discharge position, as show in FIG. 7. The loop conduits 58, 59 are allowed to communicate with the vent pipe 61 and the communication pipe 62, and the on-off valves 18, 46 are closed. The on-off valves 51, 57 are opened to suction air from the vent pipe 61 and the air is sent to the communication pipe 62 from the loop conduits 58, 59 to pressurize the separation vessel 10.

A muddy-liquid mixture including the soil 17, the metal ions such as radioactive cesium ions, strontium, heavy metals, and carbonated water 49, that have been separated, in the separation vessel 10 is sent to the solid-liquid conduit 52, and then to the solid-liquid separation filter 53. The muddy-liquid mixture is separated into solid and liquid, and the separated liquid 37 including the radioactive materials, the metal ions such as heavy metals, and the carbonated water 49, that have been separated, is sent to the electrolysis tank 13.

Then, the separated liquid 37 is introduced to the adsorption filter 42 before being introduced to the electrolysis tank 13. The filter 42 adsorbs the radioactive materials and the metal ions such as the heavy metals in the separated liquid 37. The filtered separated liquid 37 that has passed through the filter 42 is introduced into the electrolysis tank 13 for electrolysis.

Electrolysis in the electrolysis tank 13 is as shown in FIG. 8. A switch 34 is tuned on to pass a current between the cathode 31 and the airtight container 30, which is an anode. Hydrogen is generated on the cathode 31, and oxygen is generated in the airtight container 30 which is an anode.

A trace amount of tritium exists in the hydrogen, and the bubbles of the hydrogen containing tritium move up along the cathode 31 and the deposition member 36. When the bubbles reach the liquid level of the separated liquid 37, the bubbles are collected in the collector 35.

Then, the suction pump 40 is actuated to suction hydrogen containing the collected tritium. The hydrogen is introduced into the trap 38 and injected into the gas cylinder 41. The hydrogen is charged into the gas cylinder 41 to about the atmospheric pressure.

Oxygen is generated from the side surfaces of the airtight container 30. The air bubbles move up along the side surfaces and to the upper space in the collector 35 provided at the upper part of the airtight container 30, whereby the bubbles of oxygen accumulate in the space. In this case, the insulating coating 30a is formed on the bottom of the airtight container 30 so that oxygen is not generated from the insulated portion. A safety valve 72, which is normally closed, is attached to the top of the airtight container 30. When the accumulated oxygen in the airtight container 30 reaches a predetermined pressure or more, the safety valve 72 is opened to discharge the oxygen to the outside via a discharge pipe 73.

The remained radioactive materials and the metal ions such as heavy metals filtered through the adsorption filter 42 during electrolysis are electrophoresed in the separated liquid 37. Then, they are deposited on the cathode 31 and the deposition members 36, to which the same potential as the cathode 31 is applied.

As described above, the separated liquid 37 in the airtight container 30 is electrolyzed to deposit the radioactive materials and the metal ions such as heavy metals on the cathode 31 and the deposition member 36, while hydrogen containing tritium is charged into the gas cylinder 41 to remove the metal ions containing the radioactive materials and hydrogen gas from the separated liquid 37 and to prepare clean water containing the carbonated water 49.

The separated liquid 37 containing the carbonated water 49 which has been cleaned in the manner as described above is returned to the separation vessel 10 and utilized. In that case, the suction pump 15 is actuated as shown in FIG. 10. The switching lever 63 is switched from the discharge position to the suction position to close the on-off valves 18, 46. The on-off valves 51, 57 are opened to suck muddy water containing the carbonated water 49 in the separated liquid 10 via the communication pipe 62, thereby creating a negative pressure in the separation vessel 10. The clean separated liquid 37 in the separation vessel 13 is suctioned with the separation-liquid duct 56 and then introduced to the separation vessel 10 through the solid-liquid conduit 52.

The decontaminated soil 17a that has been collected is dried by the sun or by heating. After the decontaminated soil 17 is dried, a predetermined amount of soil activator 65 is added and mixed to decontaminate and modify the collected soil 17.

The soil activator 65 includes organic fertilizers such as compost, mycorrhizal fungi, or various kinds of chemical fertilizers including nitrogen, phosphorus, and potassium. The soil 17a modified is returned to the original field in which the soil has been collected, thereby reducing the volume of the contaminated soil 17. Reference numeral 64 represents a pH sensor for measuring acid concentration of the carbonated water 49 in the separation vessel 10. Reference numeral 66 denotes a decontamination worker.

In some embodiments, the powder fire extinguishant used as a soil activator 65 may be one for which the expiry date has passed. The powder fire extinguishant contains monobasic ammonium phosphate or ammonium sulfate, whereby the fire extinguishant can be used effectively, despite its expiry date.

A predetermined amount of the radioactive materials accumulate on the cathode 31 and deposition member 36 in the electrolysis tank 13 by electrolysis so that the used electrolysis tank 13 needs to be disposed of and replaced based on the electrolysis throughput of the separated liquid 37. When the used electrolysis tank 13 is disposed, the on-off valve 57 is detached from the airtight container 30, and the separation-liquid duct 56 is cut at the middle portion to disconnect the solid-liquid separation filter 53.

At that time, the adsorption filter 42 also needs to be disposed of and replaced. However, the adsorption filter 42 is placed in the airtight container 30 and thus can be disposed of and replaced at the same time as the electrolysis tank 13.

Further, the lead 32 is cut and reused with the electrode 33 and the switch 34. In addition, the pH sensor 43 can be reused.

Further, the trap 38 is cut at the middle portion to reutilize the suction pump 40 and the discharge pipe thereof. The water supply conduit 28 is cut at the end to reutilize the remaining portions of the on-off valves 29, 26 and the water supply conduit 28.

As described above, the peripheral components of the used electrolysis tank 13 is removed and formed into a cylindrical shape. The airtight container 30 stores the cathode 31, the plural deposition members 36, the metal ions containing the radioactive materials deposited on these components, the collector 35, the remaining separated liquid 37, the adsorption filter 42, and the safety valve 72, that are left after use. Then the electrolysis tank 13 is stacked in an upright position and then stored in a safe storage facilities 67, which is made of concrete. This state is shown in FIG. 11 and FIG. 12.

Meanwhile, after the used electrolysis tank 13 is removed, a new electrolysis tank 13 is insulated and installed at the same position on the decontamination vehicle 9. The separation-liquid duct 56 has one end connected to the solid-liquid separation filter 53 and the other end connected the on-off valve 57. One end of the trap 38 is attached to the inside of the airtight container 30, and the other end is connected to the suction pump 40. A discharge pipe of the suction pump 40 is inserted in a new gas cylinder 41.

Additionally, one end of the lead 32 is connected to the top end of the cathode 31, and the other end is connected to the airtight container 30. The pH sensor 43 is attached to the airtight container 30 and replaced.

Figure 13:
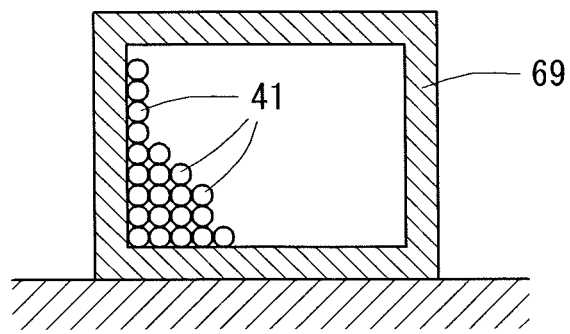
FIG. 13 shows a state of gas cylinder charged with hydrogen being stored according to the invention.

Storage facilities 69, which is similar as the storage facilities 67, is provided for storing the gas cylinder 41 charged with hydrogen gas. The gas cylinder 41 is placed horizontally and stored in the facilities 69 as shown in FIG. 13. In this case, a valve (not shown), which is normally closed, is provided at the mouth portion of the gas cylinder 41 to prevent the charged hydrogen gas from leaking.

Additionally, in drawings, reference numerals 70, 71 denote water supply pumps for water supply conduits 27, 28 provided at the lower part of the decontamination vehicle 9.

Figure 2:
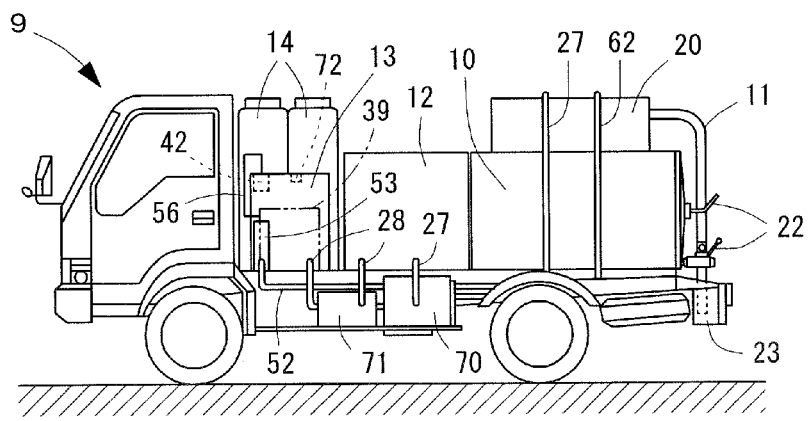
FIG. 2 is a front view showing the enlarged decontamination vehicle of FIG. 1.

The decontamination method and system for soil and the like configured as described above require a decontamination vehicle 9 configured by modifying a conventional vacuum truck. The vehicle body is equipped with the separation vessel 10, the water supply tank 12, the electrolysis tank 13, the gas cylinder 14 charged with carbon dioxide, the suction pump 15 for suctioning soil, plants, and accumulated water in fields, the solid-liquid separation filter 53, the soil activator 65, and the adsorption filter 42. This state is shown in FIGS. 2 and 3.

The separation tank 10 is formed by a box container having an openable lid. The separation tank 10 is provided at the top with a rotatable cylindrical reel 16 around which the suction hose 11 can be wound. The reel 16 is rotatably biased in the counterclockwise direction via a recoil spring (not shown) and around which the suction hose 11 can be wound.

Figure 3:
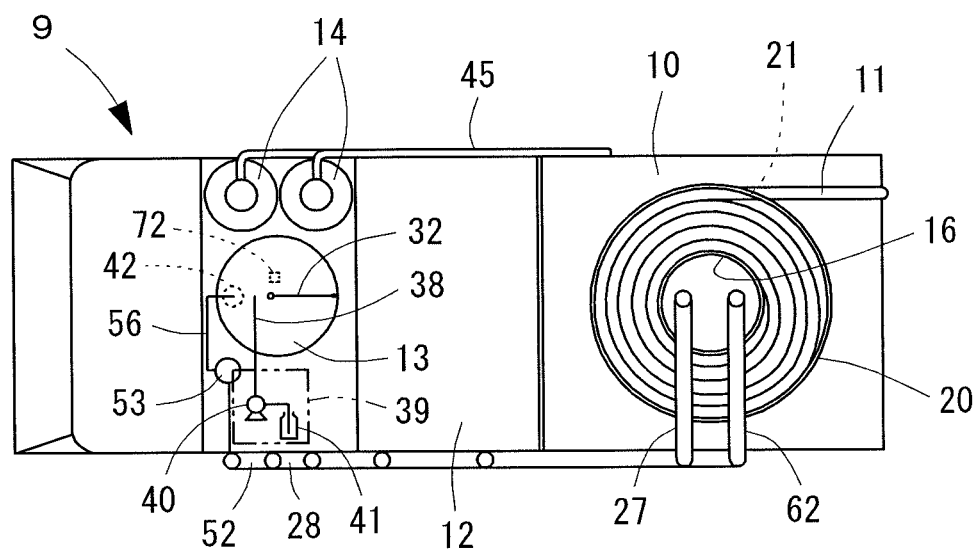
FIG. 3 is a plan view of FIG. 2.

When the contaminated soil is suctioned, the suction hose 11 is pulled outwardly and the reel 16 is rotated in the clockwise direction in FIG. 3, thereby unreeling the suction hose 11.

The suction hose 11 has one end which is in communication with the inside of the separation vessel 10 and has the other end for introducing the sucked contaminated soil 17 into the separation vessel 10. The base part of the suction hose 11I is provided with an on-off valve 18. The other end of the suction hose 11 is provided with a filter 19 for preventing foreign matter to be sucked.

The water supply tank 12 is formed by a box container having an openable lid and placed adjacent to the separation vessel 10. The water supply tank 12 stores a predetermined amount of clean water 24 therein which is to be supplied to the separation vessel 10 and the electrolysis tank 13.

The on-off valves 25, 26 are provided at the bottom of the water supply tank 12. Respective one ends of water supply conduits 27, 28 are connected to the on-off valves 25, 26. The other end of the water supply conduit 27 is provided at the upper part in the separation vessel 10, and the other end of the water supply conduit 28 is connected to the on-off valve 29 provided at the bottom of the electrolysis tank 13. The water supply conduits 27, 28 are respectively provided with the water supply pumps 70, 71.

The electrolysis tank 13 includes the cylindrical airtight container 30 made of stainless steel plate and has a capacity of about 1.8 L. The surface of the electrolysis tank 13 is coated with lead to shield radiation. The electrolysis tank 13 is provided isolated from the vehicle body and the adjacent components. The electrolysis tank 13 is placed at the front space of a loading platform of the decontamination vehicle 9 and adjacent to the gas cylinder 14 and the water supply tank 12. The rod-like cathode 31 is vertically provided and passes through the center of the airtight container 30. The lead 32 is wired to the cathode 31 and the airtight container 30, which is an anode, and the lead 32 is connected to a DC power 33 and a switch 34.

The lower end of the cathode 31 is provided immediately above the bottom of the airtight container 30. A cylindrical collector 35 for collecting hydrogen gas is provided on the middle and high portion of the cathode 31 in the airtight container 30. The collector 35 is formed in a deep cylindrical container having an opening on one side and provided in the airtight container 30 with the opening facing downwardly.

The adsorption filter 42 is attached to the top of the airtight container 30, and the filter 42 is connected to the separation-liquid duct 56. The lower end of the separation-liquid duct 56 is placed immediately above the bottom in the airtight container 30, the safety valve 72 is attached to the top of the inside of the airtight container 30, and the discharge pipe 73 is open to the outside of the container 30.

Additionally, a plurality of deposition members 36 is provided adjacent to each other and at the inner side of the collector 35. The deposition members 36 are placed to surround the cathode 31 and electrically connected to each other. The deposition members 36 are submerged into the separated liquid 37 during electrolysis.

The trap 38 has one end provided above the liquid surface of the separated liquid 37 and at the upper part of the collector 35. The other end of the trap 38 passes through the collector 35 and the airtight container 30 and connects to a hydrogen-gas charging device 39 provided outside.

The hydrogen-gas charging device 39 includes a suction pump 40 and a gas cylinder 14 for charging hydrogen gas. The inlet of the gas cylinder 14 is normally closed and provided with an on-off valve (not shown) to which the end of the trap 38 is removably attached. The hydrogen-gas charging device 39 is placed adjacent to the electrolysis tank 13.

The gas cylinder 14 stands adjacent to the electrolysis tank 13. An on-off valve 44 is provided at the top end of the gas cylinder 14. The on-off valve 44 is connected to one end of a gas conduit 45, and the other end of the gas conduit 45 is connected to an on-off valve 46 provided at the bottom of the separation vessel 10.

The three-way valve 47 is provided in the gas conduits 45. One end of the gas conduit 48 is connected to the three-way valve 47, and the other end of the gas conduit 48 is connected to the lower peripheral surface of the electrolysis tank 13 to supply carbon dioxide to the water supply tank 12 and the electrolysis tank 13 selectively.

After water is supplied to the separation vessel 10, carbon dioxide is supplied to the separation vessel 10 from the gas cylinder 14 via the gas conduit 45. Carbonated water ($H_2CO_3$) 49 having a predetermined acid concentration is prepared by using the carbon dioxide in the separation vessel 10 as an eluting solvent for radioactive cesium.

The on-off valve 51 is provided at the bottom of the separation vessel 10. A solid-liquid conduit 52 has one end connected to the on-off valve 51, and the other end connected to a tubular solid-liquid separation filter 53 which is vertically long.

The solid-liquid separation filter 53 having a rotating tube (not shown) therein is placed vertically. The rotating tube includes a centrifuge (not shown) therein. In the solid-liquid components introduced from the separation vessel 10, the soil 17 is moved to the outer side of the rotating tube, while a fluid contaminated lightly including the carbonated water 49 with radioactive cesium ions and tritiated water mixed therein is move to the inner side of the rotating tube to perform solid-liquid separation.

The decontamination vehicle 9 includes the separation vessel 10, the water supply tank 12, the small tank 13, the gas cylinder 14, the suction pump 15, the solid-liquid separation filter 49, and the suction hose 11 which can be wound being provided on the top of the separation vessel 10. These components are efficiently and compactly provided. Thus, the decontamination vehicle 9 can be minimized in size and weight, and provided at a lower cost. Further, the decontamination vehicle 9 can be moved to terraced paddy fields in mountains and narrow farm roads in rural areas. The decontamination vehicle 9 can perform a series of decontamination work with the mounted equipment by taking advantage of its mobility, without requiring any heavy machinery for collecting the soil 17.

Next, when the soil 17 and the water 4 contaminated with the radioactive materials are decontaminated by using the decontamination vehicle 9, a predetermined amount of clean water 24 is stored in the water supply tank 12 in advance because clean water 24 may not be obtainable on site. Additionally, a predetermined amount of water 24 is stored in the separation vessel 10. The decontamination vehicle 9 is moved to the object area to be decontaminated 1, such as the field 3, the paddy field 5, mountains and forests, fallow farmlands, or lakes and marshes, and parked on, for example, an adjacent farm road 8. This state is shown in FIG. 1. FIG. 5 shows a state of the separation vessel 10, the water supply tank 12, the electrolysis tank 13, and the suction pump 15 before decontamination is started.

At the beginning of the decontamination work, the carbon dioxide charged into the gas cylinder 14 is sent to the water 24 in the separation vessel 10 via the gas conduit 45, and the agitator 50 is actuated to agitate the carbon dioxide and the water 24, thereby forming carbonated water 49 having a predetermined acid concentration based on the pH sensor 42. In some embodiments, the acid concentration of the carbonated water 49 is set to pH 3 to 6.

In this case, since the carbon dioxide is pressurized to atmospheric pressure or more, and more pressurized carbon dioxide is dissolved into the water 24, thereby facilitating a rise in the acid concentration of the carbonated water 49. In some embodiments, the weakly-acidic carbonated water 49 formed by the carbon dioxide and the water 24 is used as an eluting solvent for cesium. Accordingly, strong acid, such as oxalic acid, which is expensive and hazardous in handling, is not required, and a decontamination work, which will be described later, can be performed safely.

After the carbonated water 49 is prepared as described above, the suction hose 11 is unreeled from the separation vessel 10. The worker 66 moves to a predetermined position for the decontamination work, holding the suction hose 11. Before or after unreeling the suction hose 11, the suction pump 15 is actuated and the switching lever 63 is switched to the intake position. The air in the separation vessel 10 is sucked through the vent pipe 61 and the communication pipe 62, thereby enabling the suction hose 11 to suck the object from the end. This state is shown in FIG. 6.

In such a situation, the end of the suction hose 11 is positioned immediately above the surface soil 2 of the contaminated field 3. In the case of the paddy field 5 or wetlands, the end of the suction hose 11 is submerged in the contaminated water 4 to suck the contaminated soil 17, contaminated water 4, and tritiated water mixed in the contaminated water 4, that are immediately below the suction hose 11. This state is shown in FIG. 1 and FIGS. 4(*a*) and 4(*b*).

Then, the contaminated water 4, tritiated water, and contaminated soil 17 are sucked from the tip end of the suction hose 11, and moved to the separation vessel 10 guided by the suction hose 11. This state is shown in FIG. 6.

A mixture of the soil 17, the contaminated water 4, and tritiated water suctioned as described are moved to the upper part of the separation vessel 10 guided by the suction hose 11, and fall in the carbonated water 49 in the separation vessel 10 from the open end of the suction hose 11. This state is shown in FIG. 6.

Thus, the radioactive cesium ions adhered to or deposited on the soil 17 or the contaminated water 4 are cleaned and dissolved in the carbonated water 49, and the cesium ions that have been separated from the soil 17 and the contaminated water 4 exist in the carbonated water 49.

In this case, the acid concentration of the carbonated water 49 gradually decreases as the soil 17 and the contaminated water 4 are introduced. The changes in the acid concentration are checked with the pH sensor 42 and the acid concentration is kept at a predetermined level by supplying carbon dioxide from the gas cylinder 14 as needed.

Then, the suction is stopped once after a predetermined amount of the contaminated soil 17 and the contaminated water 4 are suctioned. They are stirred for a predetermined time in the separation vessel 10. When the cesium ions are sufficiently dissolved in the carbonated water 49, the on-off valve 18 is closed and the suction hose 11 is wound back around the reel 16, completing the suction work of the contaminated soil 17 and the contaminated water 4.

Then, the on-off valve 51 is opened, and the switching lever 63 is switched from the suction position to the discharge position.

With the above operation, the air is taken from the vent pipe 61 and then sent to the communication pipe 52 via the loop conduits 58, 59. The air is discharged from the top of the separation vessel 10 and whereby the separation vessel 10 is pressurized.

Accordingly, the contaminated soil 17 and the contaminated water 4 are sent to the solid-liquid conduit 47 from the on-off valve 51 together with cesium ions separated from the tritiated water. These solid and liquid components are introduced into the solid-liquid separation filter 53.

In the solid-liquid separation filter 53, the centrifuge is started before or after switching the switching lever 63. The solid-liquid components are introduced into the rotating tube, and the contaminated soil 17 is moved to the outer side of the rotating tube, while the carbonated water 49 which does not include no soil 17 is moved to the inner side of the rotating tube by their specific gravities, whereby solid-liquid separation is performed. At that time, the carbonated water 49 adhered to the soil 17 is separated from the soil 17 together with radioactive cesium ions by centrifugal effect.

Accordingly, about the total amount of radioactive cesium ions and tritiated water are sent to the separation-liquid duct 56 together with the carbonated water 49 as the separated liquid 37. The soil 17*a* which does not include radioactive cesium ions is allowed to sink and accumulate in the lower part of the separation filter 49. This state is shown in FIG. 7.

The separated liquid 37 is moved to the adsorption filter 42 provided at the top of the electrolysis tank 13 through the separation-liquid duct 56. The metal ions such as the radioactive materials and heavy metals are adsorbed by the filter 42 and the separated liquid 37 is flowed down to the airtight container 30 to soak the cathode 31 and deposition members 36 inside.

After the separated liquid 37 is introduced into the electrolysis tank 13, the suction pump 15 is stopped and then the on-off valve 57 is closed. After checking the acid concentration of the separated liquid 37 with the pH sensor 43, carbon dioxide is supplied to the electrolysis tank 13 as needed to adjust the acid concentration of the carbonated water 49. At the same time, a heater (not shown) attached to the outside of the electrolysis tank 13 is turned on to promote electrophoresis of radioactive cesium ions. This state is shown in FIG. 7.

Then, the switch 34 is turned on to pass a current between the electrodes 30, 31 to perform electrolysis of the separated liquid 37. Oxygen is generated in the airtight container 30, which is an anode, and hydrogen is generated at the cathode 31.

Oxygen is generated from the side surfaces in the airtight container 30, and the air bubbles move up along the side surfaces and accumulate in the upper space in the collector 35. The insulating coating 30*a* is provided at the bottom of the airtight container 30 so that oxygen is not generated from the insulating coating 30*a*, thereby collecting the hydrogen safely.

As described above, oxygen accumulated in the upper space in the collector 35 reaches a predetermined pressure, the safety valve 72 automatically opens and releases the oxygen to the outside through the discharge pipe 73.

The air bubbles of the generated hydrogen float in the separated liquid 37 along the cathode 31 and the deposition member 36, and moved to the liquid level and collected in the collector 35.

As the hydrogen is collected, the air in the collector 35 is pushed out. After the hydrogen is concentrated to the predetermined concentration, the suction pump 40 is started and the hydrogen in the collector 35 is suctioned and introduced to the trap 38. The hydrogen is then injected and charged into the gas cylinder 41 equipped with the end of the trap 38. This state is shown in FIG. 8.

When the separated liquid 37 is electrolyzed, the radioactive materials and the metal ions such as the heavy metals dissolved in the carbonated water 49 travel toward the side of the cathode 31 and the peripheral deposition components 36 by electrophoresis and then deposited and attached thereon. In this case, the deposition members 36 are provided densely to surround the cathode 31. Thus, the metal ions are deposited precisely and reliably on the deposition members 36 and the cathode 31, and foreign matters in the separated liquid 37 are adsorbed and cleaned. This state is shown in FIG. 8.

As described above, by charging hydrogen into the gas cylinder 41 and depositing the radioactive materials and the metal ions such as the heavy metals on the cathode 31 and the deposition members 36 for a predetermined period of time, a predetermined amount of the radioactive materials accumulate in the electrolysis tank 13. As a result, the electrolysis tank 13 needs to be disposed of and replaced.

Then, the suction pump 15 is actuated, and the switching lever 63 is switched to the suction position to close the on-off valves 18, 46. The on-off valves 51, 57 are opened to suck muddy water containing the carbonated water 49 in the separated liquid 10 via the communication pipe 62, thereby creating a negative pressure in the separation vessel 10. The clean separated liquid 37 in the separation vessel 13 is suctioned with the separation-liquid duct 56 and then refluxed to the separation vessel 10 via the solid-liquid separation filter 53 and the solid-liquid conduit 52. Accordingly, the clean separated liquid 37 can be effectively used. This state is shown in FIG. 10.

The adsorption filter 42 placed in the electrolysis tank 13 adsorbs the metal ions such as the radioactive materials and heavy metals, whereby a predetermined amount of the radioactive materials accumulate. Then, the used adsorption filter 42 is stored together with the electrolysis tank 13 in the storage facilities 67.

The gas cylinder 41 charged with the predetermined amount of hydrogen is removed from the trap 38 and then stored in the storage facilities 69.

A predetermined amount of the soil 17a which has been separated may accumulate on the solid-liquid separation filter 53 by the solid-liquid separation and this may become a problem for a next use. In such a case, the soil 17a is collected from the solid-liquid separation filter 53. In this case, the discharge valve 54 is opened and the soil 17a is dropped from the discharge pipe 54. The collected soil 17a is then dried. A specified soil activator 65 is added to the dried soil 17a to improve or modify the soil 17.

The soil activator 65 is selectable from organic fertilizers such as compost, mycorrhizal fungi, or various kinds of chemical fertilizers including nitrogen, phosphorus, and potassium. Such soil activator 65 is added to and mixed with the soil 17a, and the soil 17a is returned to the original field 3 in which the soil has been collected. This state is shown in FIGS. 4 (*g*) and (*h*).

In some embodiments, the powder fire extinguishant used as a soil activator 65 may be one for which the expiry date has passed. The powder fire extinguishant contains monobasic ammonium phosphate or ammonium sulfate. The hydrophilic fertilizer is made by using the powder fire extinguishant, whereby the fire extinguishant can be used effectively despite its expiry date.

Accordingly, the soil 17a which has been improved or modified is returned to the field 3 from which the contaminated soil 17 is collected. The soil is improved and becomes more fertile than the original state. Thus, farming can be restarted more promptly in this method than the case where the contaminated soil is simply decontaminated and returned to the field 3.

Meanwhile, clean separated liquid 37 is refluxed into the separation vessel 10, fresh water 24 in the water supply tank 12 is supplied to the separation vessel 10 as needed, and the dioxide is supplied from the gas cylinder 14 to prepare the carbonated water 49. Then the suction hose 11 is unreeled and the suction pump 15 is actuated to restart suction and collection of the contaminated soil 17, the contaminated water 4, and tritiated water mixed therein.

Then, the contaminated soil 17, the contaminated water 4, and tritiated water are introduced into the separation vessel 10 in the same manner as described above. The metal ions containing the radioactive materials are dissolved into the carbonated water 49 and then the solid-liquid separation liquid is introduced to the solid-liquid separation filter 53 through the solid-liquid separation duct 56. The eluting solvent containing the soil 17a, the radioactive materials, and metal ions is separated into solid and liquid, and the separated soil 17a accumulates in the solid-liquid separation filter 53. The separated liquid 37 containing the radioactive materials, the metal ions, and the carbonated water 49 is introduced to the adsorption filter 42 to adsorb radioactive cesium, heavy metals in the separated liquid 37.

As described above, in some embodiments, the remaining liquid of the separated liquid 37, the radioactive materials and metal ions deposited on the cathode 31 and the deposition member 36, the adsorption filter 42, and the safety valve 72 in the electrolysis tank 13 are stored collectively. Accordingly, they can be stored efficiently, compactly, and safely compared with a case in which the components are disassembled and stored individually. Additionally, an accident of radiation exposure can be prevented.

After the used electrolysis tank 13 is removed, a new electrolysis tank 13 is insulated and installed at the same position on the decontamination vehicle 9. One end of the separation-liquid duct 56 is connected to the solid-liquid separation filter 53 and the other end is connected the on-off valve 57. One end of the trap 38 is placed in the airtight container 30, and the other end is connected to the suction pump 40. A discharge pipe of the suction pump 40 is inserted in a new gas cylinder 41.

Additionally, one end of the lead 32 is connected to the top end of the cathode 31, and the other end of which is connected to the airtight container 30. Then the pH sensor 43 is replaced by attaching it to the airtight container 30. As described above, the electrolysis tank 13 is efficiently replaced at low cost since the component which has not been contaminated with radioactive material is used.

The gas cylinder 41 charged with hydrogen is stored safely in the storage facilities 69. This state is shown in FIG. 13. In this case, lithium, a small amount of which is contained in hydrogen, has a half-life of 12.32 years, which is relatively short. Before the half-life period has passed, lithium needs to be tightly stored. After the half-life period has passed, the lithium turns into helium 3 ($^3$He). Thus, helium 3 can be reused, or discharged into the air.

As described above, in some embodiments, the decontamination vehicle 9 is driven to the object area to be decontaminated 1. The contaminated soil 17 and the contaminated water 4 in the object area 1 are collected and then decontaminated speedily with the facilities provided on the decontamination vehicle 9. The soil 17a which has been decontaminated is returned to the original field 3. A series of decontamination operations can be performed in the object area 1, and thus, the above decontamination work can be carried out efficiently and speedily, thereby promoting restart of farming and reducing the amount of the contaminated soil 17.

Further, in the present embodiment, the invention can be applied not only to the contaminated soil 17 but to decontamination for the paddy field 5 and the wetlands where contaminated water 4 exists. Accordingly, the invention can be employed in wide areas and has practical effects.

In the present embodiment, in addition to radioactive cesium, tritiated water mixed in the contaminated water 4 collected from the object area to be decontaminated 1 is separated from the soil 17. The separated liquid 37 used is electrolyzed in the electrolysis tank 13. The hydrogen generated by the electrolysis is collected and trapped, and then charged into the gas cylinder 41. Additionally, tritium, a small amount of which is contained in hydrogen, is filled in the gas cylinder 41 and stored safely in the storage facility 67. Accordingly, radiation exposure by tritium can be prevented. Accordingly, anxiety for developing cancer by DNA damage or gene damage due to internal exposure of tritium can be relieved.

In the present embodiment, the used electrolysis tank 13, the adsorption filter 42, and the remaining liquid of the separated liquid 37 are sealed in the airtight container 30 so that they are stored safely. Accordingly, radiation exposure from the electrolysis tank 13 and the adsorption filter 42 is prevented, and the electrolysis tank 13 and the adsorption filter 42 are stored rationally and safely.

As described above, the decontamination method and system for soil and the like of the present invention decontaminate soil of, for example, fields, and water contaminated with radioactive materials reliably and rapidly on site, aiming to perform decontamination with precision and improved efficiency. According to the present invention, the decontaminated soil is improved by adding soil activators, and then the improved soil is returned to the original field readily to promote the restart of farming. Further, according to the present invention, the radioactive materials adhering to or deposited on the soil are separated from the soil and then concentrated precisely. According to the invention, a reduction in the volume of the contaminated soil and a safe treatment of the radioactive materials are achieved. Further, according to the invention, decontamination of radioactive cesium and tritium is achieved, thereby relieving anxiety of internal exposure to the radiation of tritium. Further, the decontamination apparatus can be disposed of efficiently and safely.

The invention claimed is:

1. A method for decontamination of an object comprising:
introducing and dispering or dissolving an object to be decontaminated, which is contaminated with radioactive materials, into an eluting solvent to separate the radioactive materials from the object to be decontaminated by dissolution of the radioactive materials into the eluting solvent, the object to be decontaminated comprising contaminated soil and contaminated water;
separating the radioactive materials dissolved in the eluting solvent and the object to be decontaminated into solid and liquid;
collecting the soil after said solid-liquid separation and from which the radioactive materials have been removed by elution:
electrolyzing the separated liquid containing the eluting solvent and the contaminated water after said solid-liquid separation by introducing the separated liquid into an electrolysis tank provided with an anode and a cathode;
depositing metal ions comprising the radioactive materials on the cathode;
collecting hydrogen containing tritium generated by the electrolysis in the electrolysis tank; and
conveying the hydrogen to outside the electrolysis tank and there trapping the hydrogen.

2. The decontamination method according to claim 1, wherein the electrolysis tank in which the electrolysis is performed is hermetically sealed.

3. The decontamination method according to claim 1, wherein oxygen is discharged from the electrolysis tank upon a pressure of the oxygen accumulated in the electrolysis tank reaching at least a predetermined value during electrolysis.

4. The decontamination method according to claim 1, further comprising arranging one or a plurality of deposition members, to which an electric current is supplied from the cathode, in proximity to the cathode, whereby the metal ions comprising the radioactive materials are deposited on the deposition members as well as on the cathode.

5. The decontamination method according to claim 1, wherein the separated liquid is introduced into an adsorption filter before being introduced to the electrolysis tank, and the metal ions comprising the radioactive materials are adsorbed by the adsorption filter.

6. The decontamination method according to claim 1, wherein the trapping of the hydrogen comprises charging the hydrogen into a gas cylinder for storage.

7. The decontamination method for soil according to claim 1, further comprising as a last step, storing the electrolysis tank, the anode, the cathode and any other apparatus contacted by the contaminated material without disturbing residual decontamination thereon.

8. The decontamination method according to claim 1, wherein the contaminated water comprises tritiated water.

9. The decontamination method according to claim 1, wherein the radioactive materials comprise radioactive cesium and tritium.

* * * * *